QUADRANTAL ERROR CORRECTING MEANS FOR A MAGNETIC ANTENNA

Original Filed Feb. 3, 1956 6 Sheets-Sheet 1

ALFRED A. HEMPHILL
JOHN M. TEWKSBURY
*INVENTORS*

*BY* Killman and Kerst
*ATTORNEYS*

ALFRED A. HEMPHILL
JOHN M. TEWKSBURY
*INVENTORS*

*BY* Killman and Kerst
*ATTORNEYS*

QUADRANTAL ERROR CORRECTING MEANS FOR A MAGNETIC ANTENNA

Original Filed Feb. 3, 1956 6 Sheets-Sheet 3

ALFRED A. HEMPHILL
JOHN M. TEWKSBURY
*INVENTORS*

*BY* Killman and Kerst
*ATTORNEYS*

QUADRANTAL ERROR CORRECTING MEANS FOR A MAGNETIC ANTENNA

Original Filed Feb. 3, 1956 6 Sheets-Sheet 4

ALFRED A. HEMPHILL
JOHN M. TEWKSBURY
*INVENTORS*

*BY*
Killman and Kerst
*ATTORNEYS*

QUADRANTAL ERROR CORRECTING MEANS FOR A MAGNETIC ANTENNA

Original Filed Feb. 3, 1956 6 Sheets-Sheet 5

ALFRED A. HEMPHILL
JOHN M. TEWKSBURY
*INVENTORS*

*BY*
Killman and Kerst
*ATTORNEYS*

ALFRED A. HEMPHILL
JOHN M. TEWKSBURY
INVENTORS.

BY
Killman and Kerst
ATTORNEYS

3,034,122
QUADRANTAL ERROR CORRECTING MEANS FOR A MAGNETIC ANTENNA

Alfred A. Hemphill, Baltimore County, and John M. Tewksbury, Lutherville, Md., assignors to The Bendix Corporation, a corporation of Delaware

Continuation of abandoned application Ser. No. 563,822, Feb. 3, 1956. This application Mar. 2, 1959, Ser. No. 796,704
10 Claims. (Cl. 343—788)

This invention relates to antennas of the magnetic type and more particularly to arrangements for compensating flush type magnetic antennas for quadrantal errors.

This application is a continuation of U.S. application Serial No. 563,822, filed February 3, 1956, now abandoned, and a continuation-in-part of U.S. applications Serial No. 459,986, filed October 4, 1954, now abandoned, Serial No. 406,006, filed on January 25, 1954, now U.S. Patent No. 2,852,776, and Serial No. 408,432, filed February 5, 1954, now U.S. Patent No. 2,718,003, all in the names of Alfred A. Hemphill and John M. Tewksbury.

A magnetic antenna is depicted in FIGS. 2, 3 and 4 of the U.S. application Serial No. 264,717, filed January 2, 1952, now U.S. Patent No. 2,740,113, for "Magnetic Antenna Systems," in the name of Alfred A. Hemphill.

The present invention provides an improvement over the previously disclosed methods in that the sensitivity of the antenna is improved.

A direction finder system incorporating a magnetic antenna, or any antenna system suitable for the purpose, will indicate the direction of arrival of radio waves at the antenna. This may not be the true direction to the transmitting station because the direction of travel of electromagnetic waves is affected by: (1) refraction, when travelling from one medium to another where the dielectric constants are different; (2) reflection, when encountering conductive material; and (3) an object in the field, where the object has an actual and/or effective permeability different than the medium in which it exists. In aircraft or surface craft installations, the greatest distortion is caused by the effect of the conducting surface of the craft. These errors are described in the book "Wireless Direction Finding" by Keen, published by Iliffe & Sons Ltd., London, England. Since the above mentioned errors change sign in each quadrant they are commonly called "quadrantal" errors.

Two usual provisions for correcting errors of the second type involve the use of fixed or adjustable cams and external correction loops. External correction loops require too much space to permit their use in flush type installations while cam correctors require additional space and power to drive them. Both provisions also substantially increase the cost of the direction finding antenna.

It is an object of this invention to provide a means for compensating for quadrantal errors in flush mounted magnetic antennas by the use of simple and inexpensive structures.

It is a further object to provide such a means which adds very little weight to the antenna installation and does not protrude from the flush mounting.

It is another object to provide such a means which does not require additional power to produce compensation.

Still another object is to improve, with respect to the aforementioned applications, the sensitivity of a quadrantal corrected antenna.

A further object is to improve, with respect to the aforementioned applications, the linearity of the antenna response as the null point is approached.

These and other objects and advantages are realized by compensating arrangements which change the sensitivity of one or more of the collector bars.

Referring to the drawings:

FIG. 1 illustrates a plan view of a typical magnetic antenna;

FIGS. 2*a* to 2*d* illustrate sensitivity and directivity patterns of the type of antenna depicted by FIG. 1;

FIG. 3 illustrates a plan view of the antenna of FIG. 1 wherein the pick-up has been rotated 45° counter-clockwise;

FIGS 4*a* to 4*d* illustrate sensitivity and directivity patterns of the antenna depicted in FIG. 3;

Figure 1:
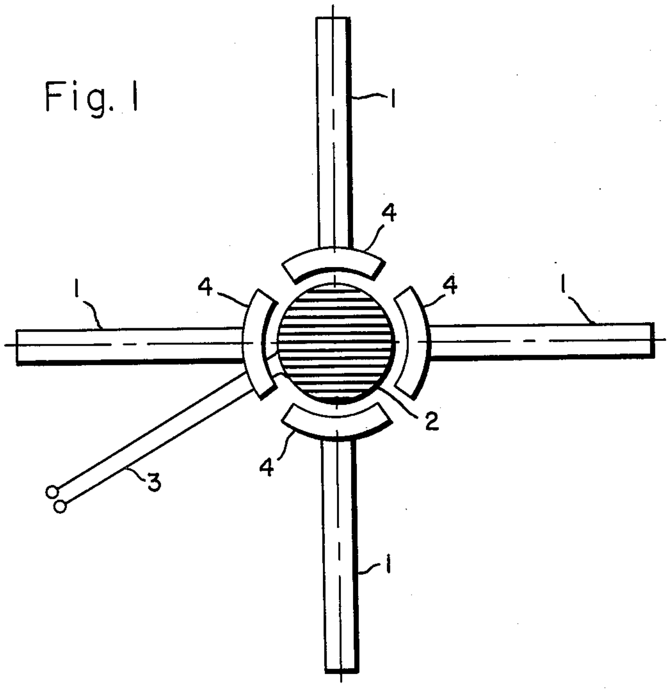
Figure 9:
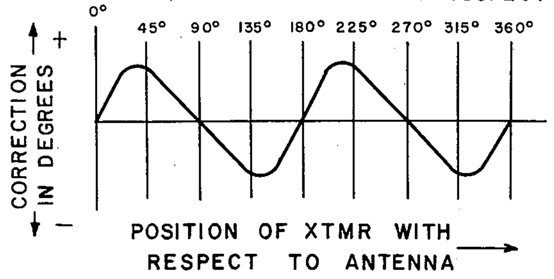
Figures 10, 11, 12, 13, 14:
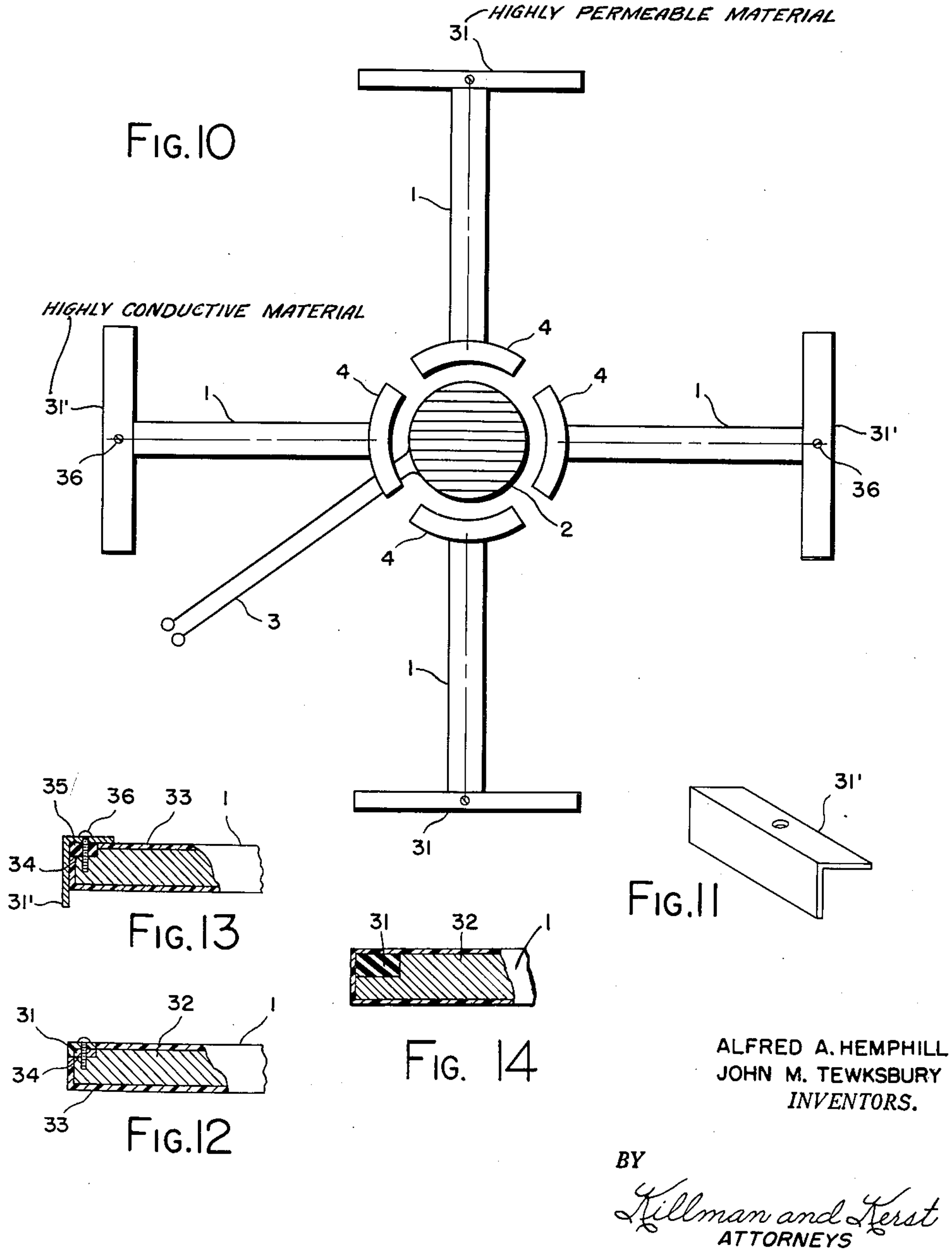

FIGS. 8*a* to 8*d* illustrate sensitivity and directivity patterns of a magnetic antenna incorporating the invention;

FIG. 9 is a plot of the correcting action of an antenna incorporating the invention;

FIG. 10 is a view similar to that of FIG. 1 showing corrective bars and shielding members added to the antenna in accordance with the invention;

FIG. 11 is a perspective view of one of the shielding members of FIG. 10;

FIG. 12 is a side view, partly in section, of an antenna element having a corrective bar 31 attached to it:

FIG. 13 is a side view, partly in section, of an antenna element having a shielding member 31' attached to it; and FIG. 14 is a view similar to FIG. 12 of a modification.

Referring to FIG. 1, a typical magnetic antenna is shown which consists of collector elements 1, pole pieces 4 and a center pick-up 2 comprising a coil of wire 3. It will be noticed that in the particular antenna illustrated, the center-lines of the collector elements 1, which are at right angles, are coincident with the center lines of their respective pole pieces 4. This means that the angles at which the magnetic wave front is intercepted by the elements 1 will be the same angles at which the energy will be coupled into the pick-up 2 by the pole pieces 4. Therefore, the field existing in the pick-up 2 will have the same directional orientation as the field existing about the antenna. Because the pick-up 2 is fixed in a particular rotational position, the amount of voltage induced in the wires 3 will be functions of the field strength and of the angle of approach thereto of the magnetic wave.

Figures 2A, 2B, 2C, 2D:
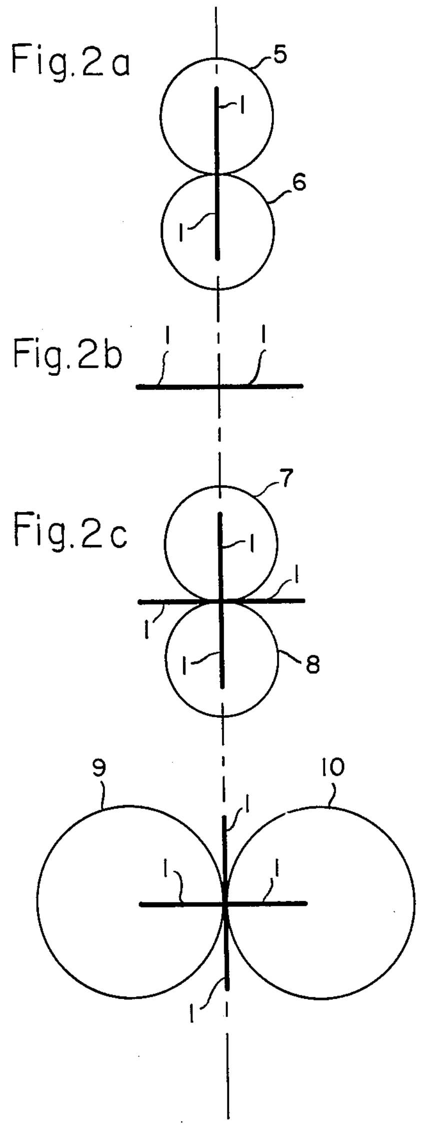

A pattern, consisting of circles 7 and 8, of the magnetic signal sensitivity of the antenna illustrated in FIG. 1 is shown in FIG. 2*c*. Although the pick-up 2 is not shown, it is located in the same position as in FIG. 1. FIG. 2*a* illustrates the pattern of the magnetic signal sensitivity of the pick-up 2 with the particular pair of the elements 1 shown in the pattern. Because of the position of the pick-up 2 with respect to these particular elements 1, a condition of maximum magnetic signal sensitivity exists when the magnetic field is parallel to these elements 1. Referring to FIG. 2*b*, the position of the pick-up 2 with respect to the particular pair of elements 1 illustrated in FIG. 2*b* is such that no signal is produced in the pick-up 2. Therefore, the magnetic signal sensitivity pattern of the composite antenna is that of FIG. 2*a*, which is shown, with both pairs of elements 1, in FIG. 2*c*. As the electric and magnetic fields are at right angles to the direction of propagation of the electromagnetic wave, a pattern of the directivity of the antenna will be at right angles to the pattern of the magnetic signal sensitivity thereof. This is illustrated in FIG. 2*d* by circles 9 and 10.

Figure 3:
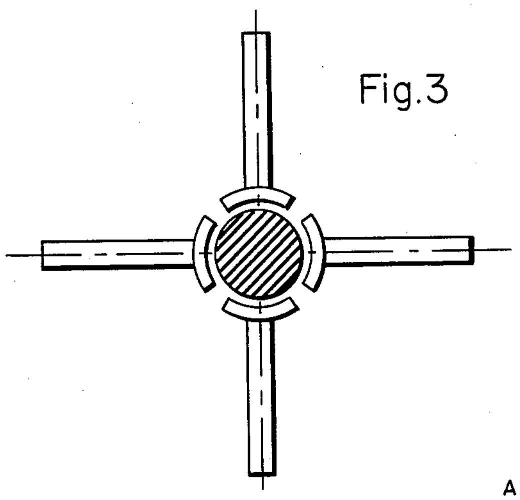
Figures 4A, 4B, 4C, 4D:
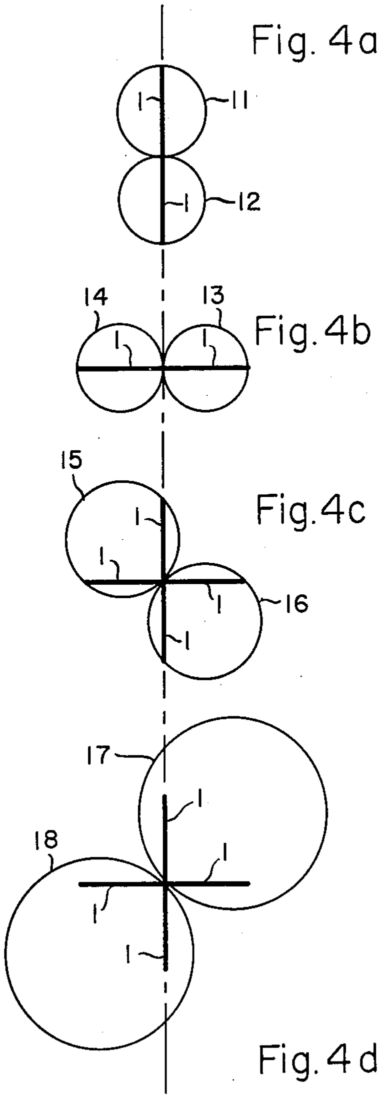

If the pick-up 3 is rotated, as in FIG. 3, the pattern of the directivity of the antenna will rotate therewith. This is illustrated in FIGS. 4*a* to 4*d*. The circles 11 through 16 of FIGS. 4*a*, 4*b* and 4*c* are plots of the magnetic signal sensitivity of the antenna and its component parts. The circles 17 and 18 of FIG. 4*d* form a plot of the directivity of the antenna of FIG. 3. It will be noted that the patterns of the magnetic signal sensitivities as illustrated by FIGS. 2*c* and 4*c* are equal in magnitude.

Figure 5:
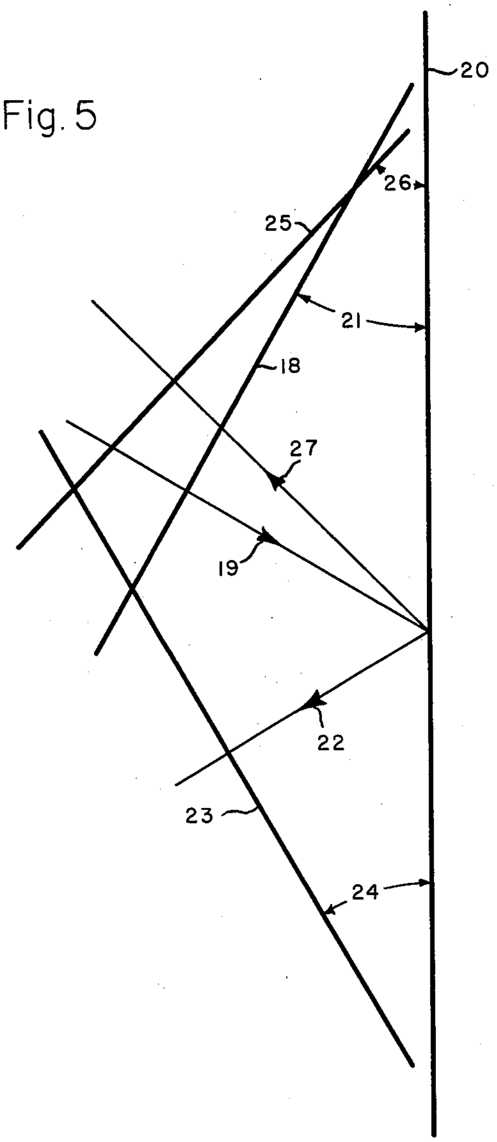
FIG. 5 illustrates wave fronts of electromagnetic waves that are in the vicinity of a conducting surface.

When an electromagnetic wave strikes an object containing a conducting surface, distortion takes place within the portion of the electromagnetic field that is in relatively close proximity to the surface. This distortion is caused by a re-radiation of energy from the surface such that the re-radiated field combines with the initial field. Referring to FIG. 5, a line 18 is shown which is parallel to the wave front of an electromagnetic field advancing in a direction indicated by an arrow 19. The line 18 encounters a conducting surface 20 at an angle 21. The energy of this field is partially re-radiated by the conducting surface 20 in a direction indicated by an arrow 22 such that a line 23, which is parallel to the wave front of the re-radiated energy, subtends an angle 24 with the surface 20. The angle 24 is equal to the angle 21. The re-radiated energy will combine with the initial energy to produce a resulting field whose wave front, as represented by a line 25, is at an angle 26 with the surface 20. It will be noticed that the resulting field appears to originate from a direction, as indicated by an arrow 27, different than the initial field. It can be proven mathematically and experimentally that the error between the indicated direction and the true direction increases from zero to a maximum and returns to zero as the angle 21 is varied between zero and 90°. The maximum error will occur slightly before the angle 21 is equal to 45° and will depend on the percentage of the energy that is re-radiated.

Figure 6:
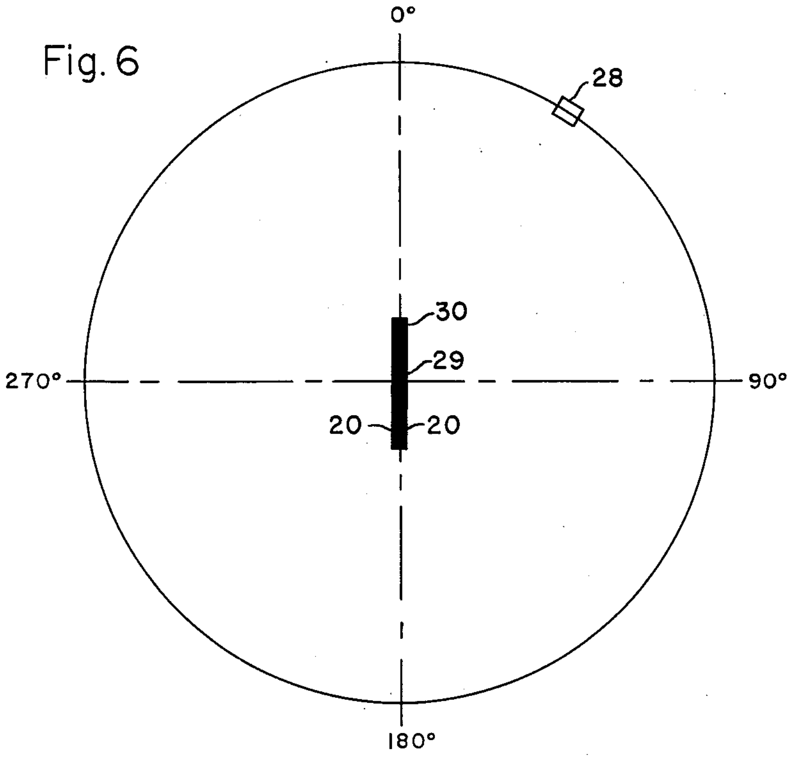
FIG. 6 shows an object about which is revolving a transmitting station.
Figure 7:
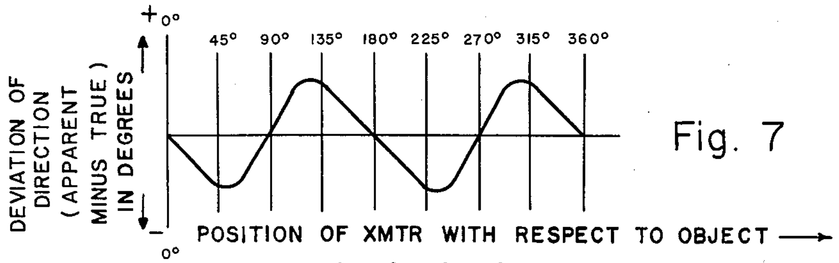
FIG. 7 is a plot of the variation of the error, as viewed from the object, existing between the apparent direction and the actual direction of the transmitting station in FIG. 6.

Referring to FIG. 6, a top view of an object 30 is shown, whose thickness is relatively small and whose flat sides are relatively large and are conducting surfaces 20. A transmitting station 28 revolves about the object 30. If the error in the electromagnetic field about a point 29 is computed for various positions of the transmitting station 28 as it revolves about the point 29, the deviation plot in FIG. 7 is obtained. This plot approaches a sine wave and reverses polarity for each 90° through which the transmitting station 28 passes.

Although an airplane does not present a flat exterior surface as discussed in the explanation of FIGS. 5 through 7, a similar phenomenon occurs and is commonly referred to as quadrantal error. Obviously, quadrantal error will produce incorrect directional indications in the airplane.

Each of the inventions of the aforementioned applications had limitations that do not exist in the present invention. The invention as disclosed in Serial No. 408,432, now Patent No. 2,718,003, had a limitation with respect to sensitivity in that the lengths of the elements 1 were dictated by the available space in which the antenna was to be placed. In the invention as disclosed in Serial No. 406,006, now Patent No. 2,852,776, an increase in sensitivity in one direction was at a sacrifice with respect to the sensitivity in another direction. Both of the previously disclosed inventions exhibited, in actual practice, a deviation from the sine function of sensitivity vs. position as the null position was approached. The present invention does not contain this limitation.

The present invention provides means for producing deviations in the opposite sense such as to reduce the effect of the quadrantal error in the signal arriving at the indicating means within the airplane.

In the preceding discussion with respect to the antennae depicted in FIGS. 1 and 3, the elements 1 were all assumed to be dimensionally and compositionally identical.

Typical directivity patterns obtained under these assumptions are illustrated in FIGS. 2*d* and 4*d*. It will be noted that the directivity pattern rotates in synchronism with the pick-up 2. If the sensitivity of one of the pairs of elements 1 is changed, the directivity pattern of the antenna will not rotate in synchronism with the pick-up 2.

This may be illustrated by increasing the sensitivity of the vertical pair of elements 1. Referring to FIGS. 2*a* through 2*d*, it will be readily seen that if the sensitivity of the vertical elements 1 is increased, the antenna will be more sensitive but the directivity pattern will remain in the same position. Referring to FIGS. 3 and 4*a* through 4*d*, an increase in the sensitivity of the vertical elements 1 will cause the pattern not to rotate in synchronism with the pick-up 2 as shown in these figures. To illustrate this effect, FIGS. 8*a* through 8*d* represent the patterns obtained from an antenna as represented in FIG. 3 where the vertical elements 1 have additional bars 31 joined at right angles to the extremities thereof. This will increase the sensitivity of the vertical elements 1, while maintaining the sensitivity of the horizontal elements 1 and requiring a minimum of additional space.

The addition of the bars 31 will decrease the deviation from the sine function relationship of the picked-up flux versus the angular displacement. This may be explained by considering a highly permeable element placed in a magnetic field. The element will have a certain fixed reluctance associated with it. This reluctance will, in effect, shunt a portion of the reluctance present in air. The air reluctance that is shunted is variable and a function of the distance along the lines of flux in the air between the leading and trailing edges of the element. If the element is placed so that a small but finite angle exists between the element and the perpendicular to the lines of flux, the air reluctance will be small and, consequently, the shunting effect caused by it will be apparent in the amount of the flux picked up by the element so that a deviation from the sine function relationship will occur. If the reluctance of the element is $R_e$, the angle of displacement is $\theta$ and the reluctance of the air path $$R_a = A \sin \theta$$

(where A is a constant), the theoretical percentage of the flux picked up by the antenna will be equal to $$\left[\frac{R_a}{R_e + R_a}\right] \sin \theta = \left[\frac{A \sin \theta}{R_e + A \sin \theta}\right] \sin \theta$$

As the angle $\theta$ is increased the term $A \sin \theta$ rapidly exceeds $R_e$ (as A is large with respect to $R_e$) and therefore the term $R_e - A \sin \theta$ will, for all practical purposes, equal $A \sin \theta$. When this happens, the picked up flux will be a function of the $\sin \theta$. The presence of the bars 31 adds another variable to the air reluctance and another constant to the element reluctance. The new variable will be $R_b = B \cos \theta$ (where B is a new constant) and the new element constant will be $R_{el}$ (which is the reluctance of an element 31). Therefore, the new formula for the theoretical percentage of the picked up flux will be:

$$\left[\frac{R_a + R_b}{R_e + R_{el} + R_a + R_b}\right] \sin \theta = \left[\frac{A \sin \theta + B \cos \theta}{R_e + R_{el} + A \sin \theta + B \cos \theta}\right] \sin \theta$$

If the constant B is large with respect to $R_e - R_{el}$, the pick-up flux will be a function of $\sin \theta$ at small angles $\theta$. If the constant B is not large with respect to $R_e - R_{el}$, the angle $\theta$ at which the air reluctance will lose its effect on the element reluctance will be less than the angle $\theta$ when the elements 31 are not used. This is because of the cancelling effect of $B \cos \theta$ on $A \sin \theta$.

Figure 8A:
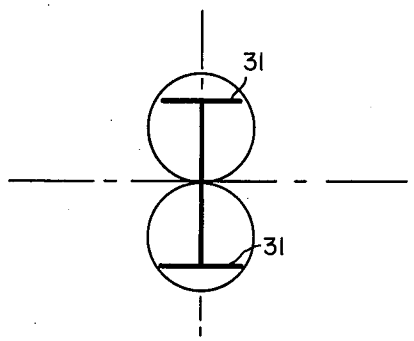
Figure 8B:
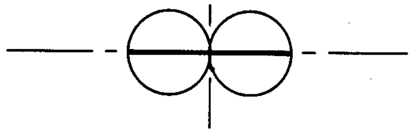
Figure 8C:
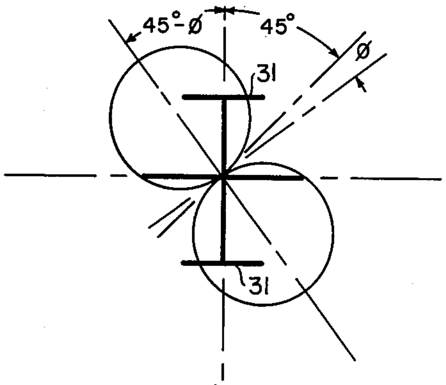
Figure 8D:
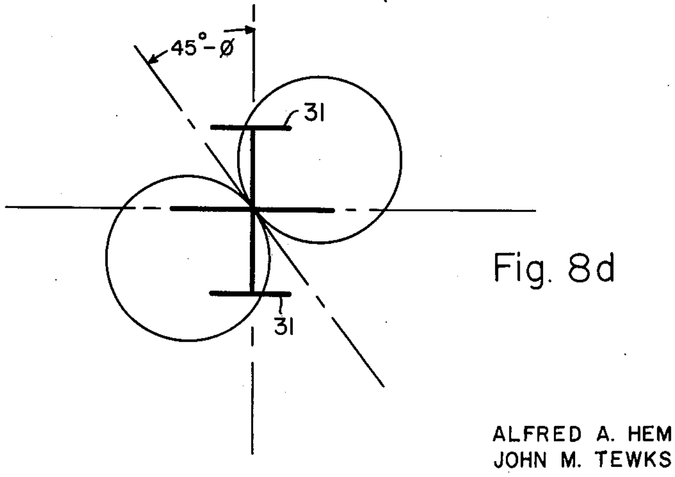

It may be proven mathematically and graphically that the directivity pattern, as illustrated in FIG. 8*d*, will rotate $45° - \phi$ when the pick-up 2, as shown in FIG. 3 is rotated 45°. A plot illustrating the deviation in the directivity for all positions of the pick-up 2 is shown in FIG. 9. It will be noted that this plot is in the opposite sense with respect to the plot of FIG. 7. This effect will sufficiently reduce the effect of quadrantal error to within tolerable limits.

If it be desired to extend the range of correction beyond that which may be obtained by use of the largest permissible size of the bars 31 on one pair of antenna elements, it may be done by effectively decreasing the sensitivity of the remaining pair of antenna elements. This can be accomplished by providing shielding members 31′ at the ends of the remaining pair of antenna elements. These members may be made of highly conductive material such, for example, as copper. They need not be of solid bar stock as are the bars 31, but may be formed of sheet metal as shown in FIG. 11.

As shown in FIG. 12 the arms 1 may be constructed of a solid core 32 of high permeability material covered with a coating 33 of plastic material. The bars 31 are constructed in a similar manner. The upper portion of the end of each antenna element is cut away as at 34, deep enough to receive the bar 31 in a manner such that it will be flush with the top and end surfaces of the element as indicated in FIG. 12. It will be noted from that figure that the portion of the bar in contact with the high permeability material of the element is not coated with plastic, so that the high permeability material of both the bar and the element are in direct contact whereby a low reluctance path exists between them.

All the antenna elements are preferably made with the end recess 34 so that the elements 31 may, if desired, be used with any element. The most usual practice, however, is to use the bars 31 on one pair of elements and to regulate the amount of correction obtained by selecting the size of the bars used. The size of the bars may be changed by using different length bars 31 or different cross-sectional area bars as shown in FIG. 14. If additional correction is desired, the members 31′ are applied to the ends of the remaining antenna elements, the size of the members being likewise selected to give the desired additional correction. In the recess 34 is placed a rectangular insulating element 35 having the same dimensions and acting with the insulating coating 33 of the element 1 to provide a high reluctance separation between the high permeability material of the element 1 and the member 31′. A brass screw 36, which has a very high reluctance, is used to secure the member 31′ to the element 1.

The effect of the member 31′ is to decrease the sensitivity of the antenna elements to which they are secured. They act as shields against the passage of flux into those antenna elements. They have the same effect as a reduction in the length of the antenna element.

Although the bars 31 and the members 31′ are shown as being in the form of straight elements, they could be in the form of segments of circles, if desired.

Although several means for performing the invention have been discussed, it is to be understood that this is not meant to limit the invention since the invention may be embodied in other forms.

What is claimed is:

1. A magnetic antenna comprising: a rotatably mounted high permeability core with a coil wound therearound; a plurality of high permeability pole pieces; a plurality of high permeability antenna elements equal in number to the said pole pieces; means securing one of each of the said elements to a respective one of the said pole pieces such that the longitudinal axes of the said elements pass through the center of the said core with the said means maintaining a region of low reluctance therebetween; a plurality of high permeability elements equal in number to the said antenna elements; and means securing each of the last said elements to the extremity of a respective one of the said antenna elements so that the said antenna elements are perpendicular thereto and low reluctance paths exist therebetween; said last elements differing in length so as to vary the sensitivity characteristics of the said antenna elements.

2. A magnetic antenna comprising: a rotatably mounted high permeability core with a coil wound therearound; a plurality of high permeability pole pieces; a plurality of high permeability antenna elements equal in number to the said pole pieces; means securing one of each of the said elements to a respective one of the said pole pieces such that the longitudinal axes of the said elements pass through the center of the said core with the said means maintaining a region of low reluctance therebetween; a plurality of high permeability elements equal in number to the said antenna elements; and means securing each of the last said elements to the extremity of a respective one of the said antenna elements so that the said antenna elements are perpendicular thereto and low reluctance paths exist therebetween; said last elements differing in cross-sectional area so as to vary the sensitivity characteristics of the said antenna elements.

3. A magnetic antenna comprising: a rotatably mounted high permeability core with a coil wound therearound; a plurality of high permeability pole pieces; a plurality of high permeability antenna elements equal in number to the said pole pieces; means securing one of each of the said elements to a respective one of the said pole pieces such that the longitudinal axes of the said elements pass through the center of the said core with the said means maintaining a region of low reluctance therebetween; a plurality of high permeability elements equal in number to the said antenna elements; and means securing each of the last said elements to the extremity of a respective one of the said antenna elements so that the said antenna elements are perpendicular thereto and low reluctance paths exist therebetween; said last elements differing compositionally so as to vary the sensitivity characteristics of the said antenna elements.

4. A magnetic antenna comprising: a rotatably mounted high permeability core with a coil wound therearound; a plurality of high permeability pole pieces; a plurality of high permeability antenna elements equal in number to the said pole pieces; means securing one of each of the said elements to a respective one of the said pole pieces such that the longitudinal axes of the said elements pass through the center of the said core with the said means maintaining a region of low reluctance therebetween; a plurality of high permeability identical elements less in number than the said antenna elements; and means securing, in a low reluctance fashion, each of the last said elements to the extremities of particular ones of the said antenna elements so that the said antenna elements are perpendicular thereto and exhibit various sensitivity characteristics.

5. A magnetic antenna comprising: a rotatably mounted high permeability core with a coil wound therearound; a plurality of high permeability pole pieces; a plurality of high permeability antenna elements equal in number to the said pole pieces; means securing one of each of the said elements to a respective one of the said pole pieces such that the longitudinal axes of the said elements pass through the center of the said core with the said means maintaining a region of low reluctance therebetween; a plurality of high permeability elements, of various cross-sectional areas, less in number than the said antenna elements; and means securing, in a low reluctance fashion, each of the last said elements to the extremities of particular ones of the said antenna elements so that the said antenna elements are perpendicular thereto and exhibit various sensitivity characteristics.

6. A magnetic antenna comprising: a rotatably mounted high permeability core with a coil wound therearound; a plurality of high permeability pole pieces; a plurality of high permeability antenna elements equal in number to the said pole pieces; means securing one of each of the said elements to a respective one of the said pole pieces such that the longitudinal axes of the said elements pass through the center of the said core with the said means maintaining a region of low reluctance therebetween; a plurality of high permeability elements, of various compositional arrangements, less in number than the said antenna elements; and means securing, in a low reluctance fashion, each of the last said elements to the extremities of particular ones of the said antenna elements so that the said antenna elements are perpendicular thereto and exhibit various sensitivity characteristics.

7. A magnetic antenna comprising: a rotatably mounted high permeability core with a coil wound therearound; two pairs of elongated high permeability antenna elements, said elements lying in a common plane and extending radially with respect to the axis of rotation of said core; a high permeability pole piece secured to the inner end of each of said antenna elements in a manner to maintain a region of low reluctance therebetween, the elements of each of said pairs having a common longitudinal axis, the respective axes of said pairs extending at right angles to each other; a bar of high permeability material secured in a low reluctance fashion to the extremity of each of said antenna elements of one of said pairs, the axis of each of said bars being perpendicular to that of the element to which it is secured, and a member of electrically conductive material secured in a high reluctance fashion to the extremity of each of said antenna elements of the remaining one of said pairs, the axis of each of the last named members being perpendicular to that of the element to which it is secured.

8. A magnetic antenna comprising: a rotatably mounted high permeability core with a coil wound therearound; two pairs of elongated high permeability antenna elements, said elements lying in a common plane and extending radially with respect to the axis of rotation of said core; a high permeability pole piece secured to the inner end of each of said antenna elements in a manner to maintain a region of low reluctance therebetween, the elements of each of said pairs having a common longitudinal axis, the respective axes of said pairs extending at right angles to each other; a bar of high permeability material secured in a low reluctance fashion to the extremity of each of said antenna elements of one of said pairs, said bar lying in said common plane and extending transversely with respect to the element to which it is secured; and an elongated member of electricially conductive material secured in a high reluctance fashion to the extremity of each of said antenna elements of the remaining one of said pairs, said member lying in said common plane and extending with its long dimension transverse to the axis of the element to which it is secured.

9. A direction finding magnetic antenna comprising: a rotatable high permeability core, a signal winding on said core, a plurality of colinear pairs of elongated high permeability elements, said pairs being angularly arranged around said core with one end of each element in low reluctance relation to said core and the other end remote from said core, a plurality of elongated high permeability members, a plurality of elongated non-magnetic conductive shields, means for securing said high permeability members to said elements adjacent the remote ends of at least one pair of said elements with low reluctance therebetween and means for securing said high conductivity shields to corresponding positions on a pair of said elements transverse to said one pair.

10. Apparatus according to claim 9 in which said conductive shields have an approximately L-shaped cross-section.

References Cited in the file of this patent

UNITED STATES PATENTS

| | | |
|---|---|---|
| 1,773,355 | Franklin et al. | Aug. 19, 1930 |
| 2,718,003 | Hemphill | Sept. 13, 1955 |

FOREIGN PATENTS

| | | |
|---|---|---|
| 707,379 | Germany | May 21, 1941 |